UNITED STATES PATENT OFFICE.

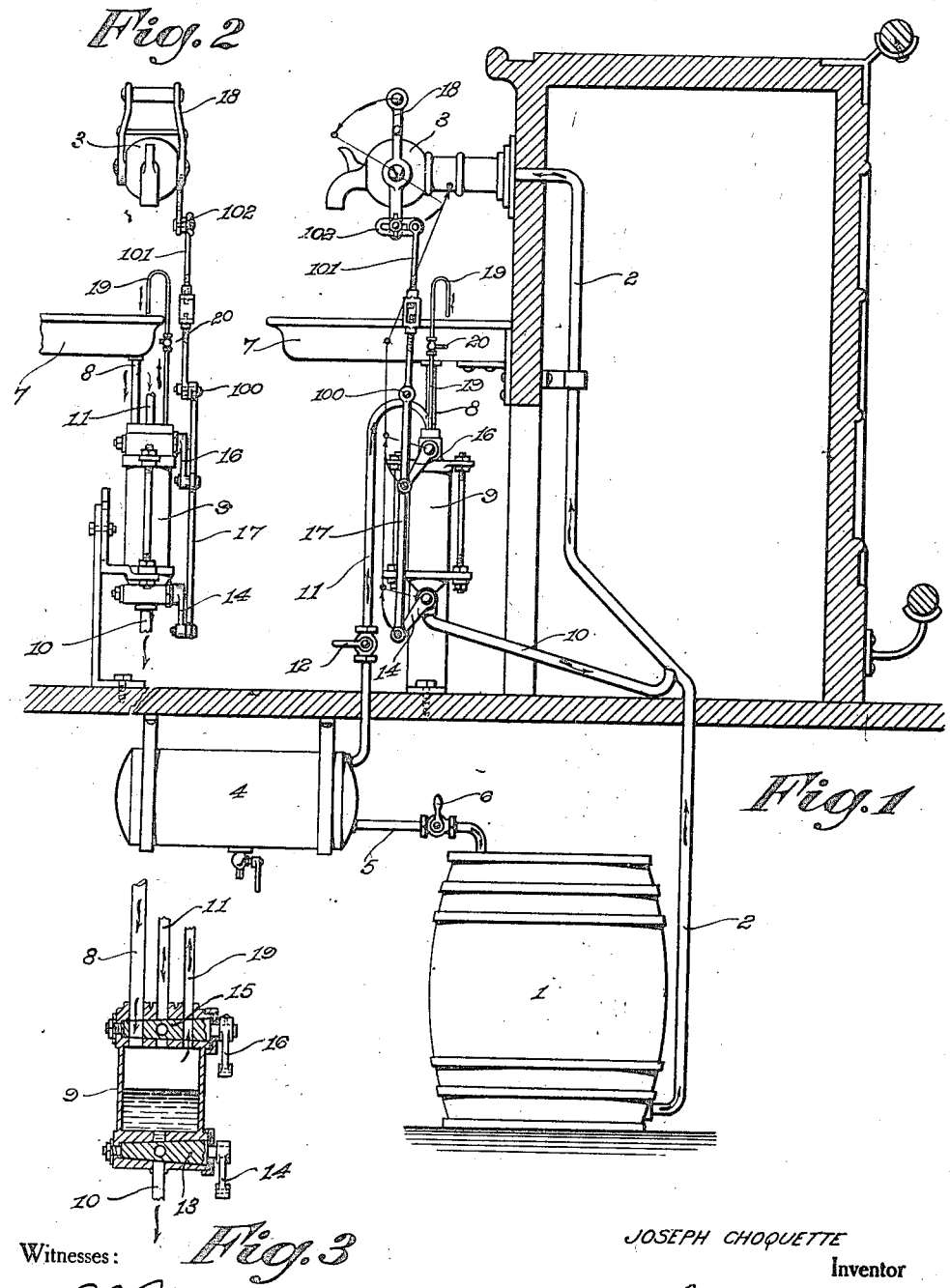

JOSEPH CHOQUETTE, OF ST. HYACINTHE, QUEBEC, CANADA.

BEER-SAVING APPARATUS.

1,031,838.  Specification of Letters Patent.  Patented July 9, 1912.

Application filed April 8, 1912. Serial No. 689,346.

*To all whom it may concern:*

Be it known that I, JOSEPH CHOQUETTE, a subject of the King of Great Britain, residing at St. Hyacinthe, Province of Quebec, Canada, have invented certain new and useful Improvements in Beer-Saving Apparatus; and I do hereby declare that the following is a full, clear, and exact description of the invention, such as will enable others skilled in the art to which it appertains to make and use the same.

The invention to be hereinafter described relates to beer saving apparatus.

In order to more clearly disclose the construction, operation, and use of the invention, reference should be had to the accompanying drawings forming part of the present application.

Throughout the several figures of the drawings like reference characters designate the same parts.

In the drawings: Figure 1 is a side elevation of the invention, as applied; and Fig. 2 is a vertical cross section through the beer trap and connections. Fig. 3 is a sectional view of the trap.

The main objects of the invention are to provide a simple, economical, efficient, compact, and automatic apparatus for returning the over flow to the keg, tank or the like.

Referring to the drawings in detail, 1 indicates a keg, tank or the like provided with the usual feed pipe 2 to the end of which is connected a beer faucet 3. In order to force the beer through the pipe 2 a pressure tank 4 is provided, with a suitable pipe connection 5 from the pressure tank to the keg. This connection is controlled by a turn plug or any other suitable form of valve 6, which is normally in open position.

Beneath the faucet 3 is mounted the usual drip pan or trough 7 to hold the glasses and catch the over flow. The drain pipe 8 leading from this drip pan delivers the over flow into a small cylindrical tank or over flow trap 9 from the bottom of which leads a branch pipe 10 which is adapted to deliver the over flow from the trap 9 into pipe 2. To the upper end of the trap 9 is connected a branch pressure pipe 11 leading from the pressure tank 4 and provided with a controlling valve 12.

The pipe 10 is provided with a rotary plug valve 13 having a single valve port and an operating handle 14. A single rotary plug 15 with two valve ports at right angles controls both pipes 8 and 11, and is provided with an operating handle 16. To the handles 14 and 16 is connected a rod 17 the upper end of which is flexibly connected at 100 with an extensible link 101 in the upper end of which is secured a slotted arm 102. To this slotted arm is adjustably clamped by a thumb screw or the like, the lower end of a lever arm 18 which acts as a handle for the plug valve of the faucet 3. As shown by the drawings, especially Fig. 3, this connection is such that when the pipe 8 is open the pipes 10 and 11 are closed, and vice versa. Thus, when the valve of faucet 3 is closed, as in the drawings, the pipe 8 will be open and the pipes 10 and 11 closed, permitting the over flow beer to run from pan 7 into trap 9. When the lever 18 is swung to open the plug valve of faucet 3 for filling the next order, the pipe 8 will be closed and the pipes 10 and 11 will be opened. This will permit the pressure to pass through the pipe 11 into trap 9 and force the over flow beer therefrom through pipe 10 and into pipe 2, for redelivery.

If desired, a small jet tube 19 may be connected to the top of trap 9 and provided with a controlling valve 20. The upper end of this tube will be bent over the edge of the pan 7 and directed toward the bottom thereof. By opening the controlling valve while the pressure is in the trap 9, an air jet may be directed into the pan to sweep the over flow into the upper end of the drain pipe 8. If valves 6 and 12 are both open at the same time, the pressure in the tank or barrel 1 and trap 9 will be the same. However, the pipe 2 leading upwardly from the tank or barrel will be filled with beer, so that the weight of the entire pipe full will be exerted as a counter balance against the pressure. On the other hand, the pipe 10 is connected to pipe 2 at a very considerable distance above the top of the barrel. Thus, the counter balancing column effective against the pressure in tank 9 is much less than that effective against the pressure in tank 1. Consequently, the beer in trap 9 will be forced from trap 9 through pipe 10 and into pipe 2. Furthermore, the upwardly rushing stream of beer from barrel 1 through pipe 2 will act as a suction to draw beer from pipe 10 into pipe 2. Or, if preferred, the over flow beer may be allowed to accumulate in trap 9 for a considerable time and then be ejected through pipe 10.

In such case, the valve 12 will remain closed until it is desired to empty trap 9, then valve 12 will be opened, valve 6 closed, and valves 13 and 15 will be turned to permit out flow of the accumulated over flow.

It is thought that the operation and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

1. In combination, a beer tank, a beer faucet provided with a controlling valve, a pipe leading from said tank to said faucet, a pressure tank, connections between said pressure tank and said beer tank, a pan beneath the aforesaid faucet, a trap beneath said pan, a drain pipe leading from said pan to said trap, a pipe leading from said pressure tank to said trap, a branch pipe leading from said trap to the first named pipe, a valve for controlling the passage through said branch pipe, a valve for controlling the passages through said drain pipe and through the pipe leading from the pressure tank to the trap, and means for automatically operating said valves as the controlling valve of the faucet is operated.

2. In combination, a beer tank, a beer faucet provided with a controlling valve, a pipe leading from said tank to said faucet, a pressure tank, connections between said pressure tank and said beer tank, a pan beneath the aforesaid faucet, a trap beneath said pan, a drain pipe leading from said pan to said trap, a pipe leading from said pressure tank to said trap, a drainage pipe leading from said trap to the first named pipe, a valve for controlling the passage through said branch pipe, a valve for controlling the passages through said drain pipe and through the pipe leading from the pressure tank to the trap, a link connected to said valves, an operating lever for the controlling valve of the aforesaid faucet, and connections between said lever and said link.

3. In combination, a beer tank, a beer faucet provided with a controlling valve, a pipe leading from said tank to said faucet, a pressure tank, connections between said pressure tank and said beer tank, a pan beneath the aforesaid faucet, a trap beneath said pan, a drain pipe leading from said pan to said trap, a pipe leading from said pressure tank to said trap, a branch pipe leading from said trap to the first named pipe, a valve for controlling the passage through said branch pipe, a valve for controlling the passages through said drain pipe and through the pipe leading from the pressure tank to the trap, means for automatically operating said valves as the controlling valve of the faucet is operated, and a jet pipe connected to said trap and adapted to deliver a sweeping jet into the aforesaid pan.

In witness whereof I have hereunto set my hand in the presence of two witnesses.

JOSEPH CHOQUETTE.

Witnesses:
ARMAND BOISSEAU,
J. A. BOISSEAU.